US011754309B2

(12) United States Patent
Maheshwari et al.

(10) Patent No.: US 11,754,309 B2
(45) Date of Patent: Sep. 12, 2023

(54) PATHOGEN SENSING FILTERS

(71) Applicant: Accenture Global Solutions Limited, Dublin (IE)

(72) Inventors: Aditi Maheshwari, San Francisco, CA (US); Mark Benjamin Greenspan, Oakland, CA (US); Lavinia Andreea Danielescu, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 117 days.

(21) Appl. No.: 17/360,295

(22) Filed: Jun. 28, 2021

(65) Prior Publication Data

US 2021/0404693 A1    Dec. 30, 2021

Related U.S. Application Data

(60) Provisional application No. 63/045,974, filed on Jun. 30, 2020.

(51) Int. Cl.
*F24F 11/74*    (2018.01)
*F24F 8/108*    (2021.01)
(Continued)

(52) U.S. Cl.
CPC .............. *F24F 11/74* (2018.01); *F24F 8/108* (2021.01); *F24F 8/22* (2021.01); *F24F 8/95* (2021.01); *F24F 11/89* (2018.01); *F24F 2110/65* (2018.01)

(58) Field of Classification Search
CPC .. F24F 11/30; F24F 11/70; F24F 11/74; F24F 8/108; F24F 8/22; F24F 8/95; F24F 11/89; F24F 2110/65; F24F 2007/001; F24F 2003/0446; F24F 7/08; B01D 46/0086; B01D 46/442
See application file for complete search history.

(56) References Cited

U.S. PATENT DOCUMENTS 6,609,967 B2    8/2003    Sharp et al.
6,796,896 B2    9/2004    Laiti
(Continued)

FOREIGN PATENT DOCUMENTS

WO    WO 2013032360         3/2013
WO    WO-2021011449 A1 *   1/2021    ............ B01D 37/04
WO    WO-2021255205 A1 *   12/2021

OTHER PUBLICATIONS

Bill Hurley, Biosensor to Measure Coronavirus Concentration in Air, Apr. 27, 2020, Tech Briefs https://www.techbriefs.com/component/content/article/tb/stories/blog/36766 (Year: 2020).*
(Continued)

*Primary Examiner* — Edelmira Bosques
*Assistant Examiner* — Michael James Giordano
(74) *Attorney, Agent, or Firm* — Fish & Richardson P.C.

(57) ABSTRACT

Implementations are directed to a smart filter apparatus including an air filter, a sensor supported by the air filter and sensitive to a pathogen, and a control unit in data communication with the sensor and operable to perform operations including receiving, from the sensor, an indication of the pathogen present in air incident on the sensor, generating, by the control unit, a pathogen alert response, and providing, by the control unit, the pathogen alert response.

17 Claims, 6 Drawing Sheets

(51) Int. Cl.
*F24F 8/95* (2021.01)
*F24F 11/89* (2018.01)
*F24F 8/22* (2021.01)
*F24F 110/65* (2018.01)

(56) References Cited

U.S. PATENT DOCUMENTS

| | | | | |
|---|---|---|---|---|
| 10,895,518 | B2* | 1/2021 | Cama | G01N 1/2205 |
| 2002/0072322 | A1* | 6/2002 | Sharp | F24F 11/63 |
| | | | | 454/229 |
| 2004/0141875 | A1* | 7/2004 | Doshi | B60H 3/06 |
| | | | | 422/4 |
| 2015/0033942 | A1* | 2/2015 | Zhang | B01D 53/0454 |
| | | | | 96/108 |
| 2017/0087499 | A1* | 3/2017 | Combs | B01D 46/0001 |
| 2019/0309972 | A1* | 10/2019 | Roen | C02F 1/008 |
| 2021/0236682 | A1* | 8/2021 | Willette | B01D 46/10 |

OTHER PUBLICATIONS

Atci et al., "Evaluation of in-duct UV-Clamp array on air disinfection: A numerical analysis," Science and Technology for the Built Environment, Jun. 16, 2020, 27(1):98-108.

Megaphone.upworthy.com [online], "Harvard and MIT researchers are developing a mask that lights up when it detects coronavirus," May 14, 2020, retrieved on Nov. 1, 2021, retrieved from URL<https://megaphone.upworthy.com/p/harvard-mit-researchers-coronavirus-mask?fbclid=Iw>, 10 pages.

Molekule.science [online], "Clear the Air: An initiative to educate about indoor air quality and what we can do to improve it," available on or before Nov. 1, 2019 via Internet Archive: Wayback Machine URL<https://web.archive.org/web/20191101154430/https://molekule.science/>, retrieved on Nov. 1, 2021, retrieved from URL<https://molekule.science/>, 10 pages.

Pardee et al., "Rapid, Low-Cost Detection of Zika Virus Using Programmable Biomolecular Components," Cell, May 6, 2016, 165(5):1255-1266.

\* cited by examiner

PATHOGEN SENSING FILTERS

CROSS REFERENCE TO RELATED APPLICATIONS

This application claims the benefit of U.S. Patent Application No. 63/045,974, filed Jun. 30, 2020, which is incorporated herein by reference.

BACKGROUND

Heating, ventilation, and air conditioning (HVAC) systems can provide ventilation, maintain pressure relationships between spaces, and maintain indoor air quality. The HVAC system can be used to deliver and remove air from spaces.

SUMMARY

Implementations of the present disclosure are generally directed to a smart filter apparatus. More particularly, implementations of the present disclosure are directed to an apparatus including one or multiple of sensors that are sensitized to detect pathogens, e.g., coronavirus, influenza, varicella, rhinovirus, etc., in air incident on the sensors. The smart filter apparatus can be located at various points within a heating, ventilation, and air conditioning (HVAC) system, for example, throughout the ducting, before or after an air circulation blower, or entering or leaving individual rooms. The smart filters can be placed in multiple rooms of a building, e.g., a multi-unit commercial or residential unit, that shares a same HVAC system, where a detection of a pathogen in a particular room can cause an isolation response of the air circulation in the particular contaminated room. The smart filter can further include a control unit that can generate an alert responsive to the sensor or an array of sensors detecting the pathogen.

In some implementations, a smart filter apparatus can include a supportive mesh or supportive fixture to hold the one or more sensors of the array of sensors that are sensitized to detect pathogens and that can be affixed to an existing filter in an air filtration system. The smart filter apparatus can alternatively include the array of sensors that are sensitized to detect pathogens when the array is located within an HVAC system.

In some implementations, a smart filter apparatus can include ultraviolet (UV) light (100-400 nm) sources to inactivate or effectively kill pathogens. This UV light may be of the UVC wavelength (100-280 nm), specifically UVGI (254 nm), far-UVC (222 nm) or any other UV wavelength. The UV light sources can be embedded within the smart filter apparatus to decontaminate a flow of air as it passes through the filter. If the UV light will be exposed externally from the ducting, far-UVC may be selected to still kill pathogens while still being safe for humans.

In general, implementations of the present disclosure generally include an apparatus including an air filter configured to filter particulates from air passing through the filter, a sensor supported by the air filter and sensitive to a pathogen, and a control unit in data communication with the sensor and operable to perform operations including receiving, from the sensor, an indication of the pathogen present in air incident on the sensor, generating, by the control unit, a pathogen alert response, and providing, by the control unit, the pathogen alert response.

These and other embodiments can optionally include the following features. In some implementations, the apparatus further includes a power source operable to provide power to the sensor and the control unit for at least a lifetime of the air filter.

In some implementations, providing the pathogen alert response includes providing, to an HVAC system, instructions to perform one or more of i) re-direct a flow of air from a room and increase air flow to the room via an air inlet of the HVAC system, and ii) isolate air circulation for the room including the air incident.

In some implementations, providing the pathogen alert response includes, providing, to the HVAC system, instructions to redirect flow of air from the room comprising blocking the flow of air from a return duct of the HVAC system and exhausting the flow of air via an exhaust vent.

In some implementations, providing the pathogen alert response includes providing, to one or more users, an alert including information about a presence of the pathogen in the air incident on the air filter.

In some implementations, providing the pathogen alert response includes activating the UV light sources, e.g., for a period of time, for a volume of air moving past the apparatus, etc.

In some implementations, the sensor is sensitive to a virus that is COVID-19.

In some implementations, the indication from the sensor includes an electrical signal.

In some implementations, the apparatus further includes a valve operable to change a flow of air, where providing the pathogen alert response includes providing, to the valve and by the control unit, instructions to actuate the valve to change the flow of air. The valve to control air flow can be a baffle.

In some implementations, the sensor is a bio-sensor coated in ribonucleic acid (RNA) or deoxyribonucleic acid (DNA). The bio-sensor can be coated in RNA or DNA such that the coating is sensitive to a particular pathogen.

In some implementations, the apparatus further includes one or more ultraviolet-C (UVC) light sources supported by the air filter and configured to emit UV-C light (e.g., far UV-C light) away from the air filter and/or onto the air filter. The apparatus can further include an optical sensor configured to detect a fluorescent signal produced by the sensor responsive to detecting the pathogen.

In some implementations, the pathogen alert response includes providing a notification to one or more users.

In general, implementations of the present disclosure include an apparatus including a sensor sensitive to a pathogen, a frame supporting the sensor and including one or more attachment points for mounting the frame in a fluidic path of an air return of an HVAC system, and a control unit in data communication with the sensor and operable to perform operations including receiving, from the sensor, an indication of the pathogen in air incident on the sensor, generating, by the control unit, a pathogen alert response, providing, by the control unit, the pathogen alert response.

These and other embodiments can optionally include one or more of the following features. In some implementations, the one or more attachment points for the mounting the frame comprise attachment points to affix the frame to an air filter located in the air return of the HVAC system. The frame can include a mesh.

In general, implementations of the present disclosure include an apparatus including multiple sensors, each sensor of the multiple sensors sensitive to a pathogen and/or multiple pathogens, and a control unit in data communication with the sensor array and operable to perform operations including receiving, from at least one sensor of the multiple sensors located within an air return duct of a heating, ventilation, and air conditioning (HVAC) system, an indication of the pathogen in air incident on the sensor, generating, by the control unit, a pathogen alert response, and providing, by the control unit, the pathogen alert response.

These and other embodiments can optionally include one or more of the following features. In some implementations, a first pathogen to which at least one sensor is sensitive is different from a second pathogen to which at least one other sensor is sensitive.

In some implementations, the sensor array is located within a duct of an air return portion of the HVAC system, such that the sensor array is in a fluidic path of return airflow from the air return portion of the HVAC system.

Particular embodiments of the subject matter described in this specification can be implemented so as to realize one or more of the following advantages. For example, an advantage of this technology is that the smart filter apparatus can be installed in an existing HVAC system without intensive modifications, enabling a fast response to the detection and control of new pathogens. The technology can be compatible with various sensing mechanisms, e.g., optical, electrochemical, etc., potentially allowing for a wide range of pathogens and/or chemicals to be detectable. The apparatus can be in the form of an adaptive sensing kit, including a mesh frame holding the sensor(s) and a control unit, which can be adjustable to mount onto existing vents and/or filters within the vents. The adaptive sensing kits can be compatible with laminar flow environments, e.g., clean rooms, hospitals, etc., or regular commercial/residential multi-unit buildings with shared HVAC flow. By relying on existing HVAC air circulation to move air past the sensors, no additional flow mechanisms are required to sample the air in a room for the pathogen. The smart filter apparatus can be installed in the path of return air flow in individual rooms such that a detection of a pathogen by a sensor of a particular smart filter apparatus can help to isolate a response to a room that includes the particular smart filter apparatus or for which the particular smart filter apparatus has been installed.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to a smart filter apparatus. More particularly, implementations of the present disclosure are directed to an apparatus including a sensor or an array of sensors that are sensitized to detect pathogens, e.g., coronavirus, influenza, varicella, rhinovirus, etc., in air incident on the sensors. Air filters used in ventilation systems can filter out particles and airborne pathogens. Ventilation systems can circulate air between multiple rooms of a building, where unfiltered particles and airborne pathogens can spread from a contaminated room to another room of the building. The smart filter apparatus can be located at an air return duct of a heating, ventilation, and air conditioning (HVAC) system. The smart filters can be placed in multiple rooms of a multi-unit commercial or residential unit that shares a same HVAC system, where a detection of a pathogen in a particular room can cause an isolation response of the air circulation in the particular contaminated room. The smart filter can further include a control unit that can generate an alert responsive to the array of sensors detecting the pathogen.

In some implementations, a smart filter apparatus can include a supportive mesh or supportive fixture to support the one or more sensors of the array of sensors that are sensitized to detect pathogens and that can be affixed to an existing filter in an air filtration system. The smart filter apparatus can alternatively include the array of sensors that are sensitized to detect pathogens when the array is located within an HVAC system.

In some implementations, a smart filter apparatus can include a valve, baffle, or the like, that can be opened/shut in response to a detection of the pathogen by the sensors. In one example, smart filter apparatus includes a baffle structure that can be closed, e.g., by mechanical or pneumatic actuation, in response to instructions provided by the control unit.

Figure 1A:
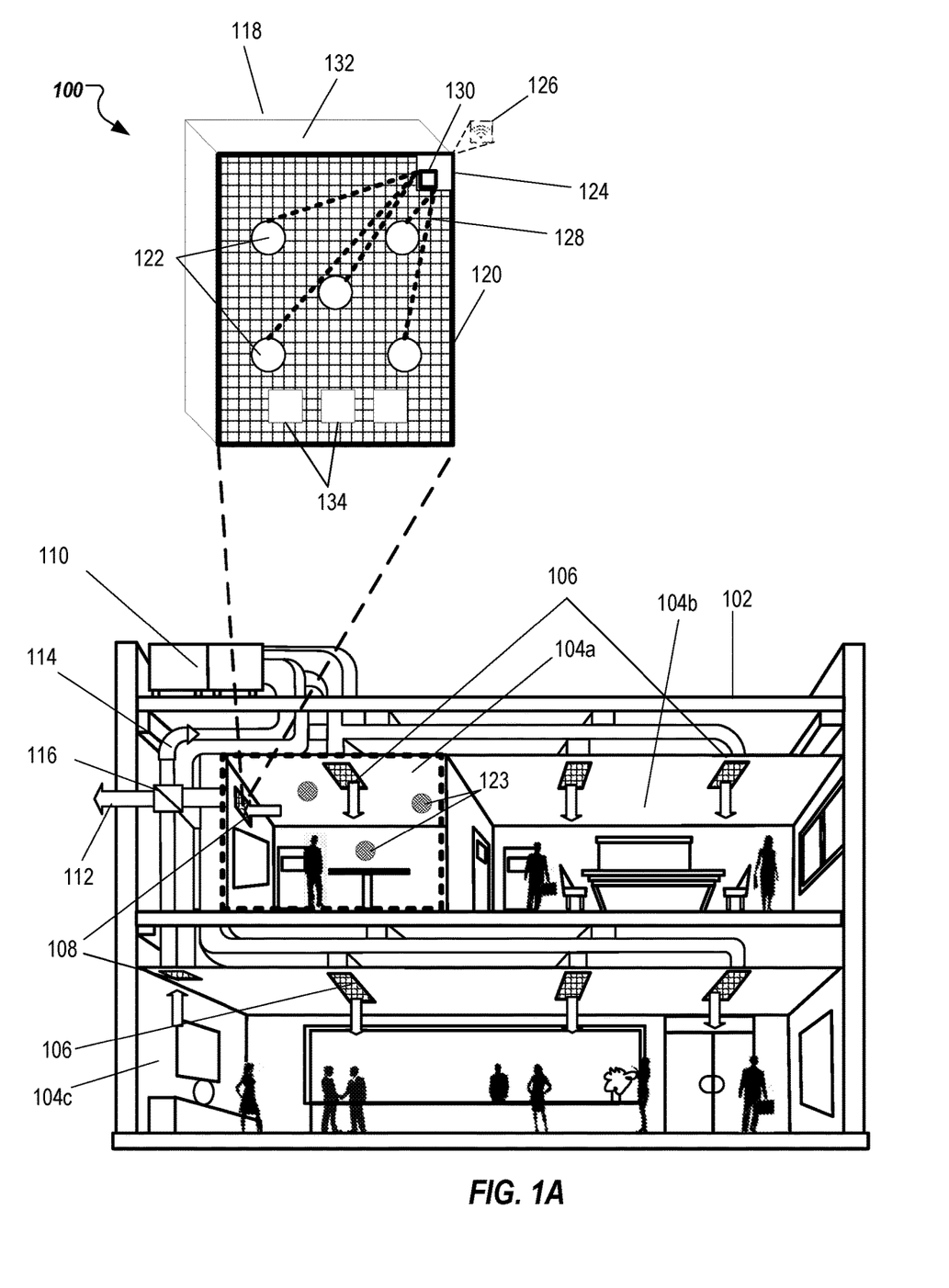
FIG. 1A depicts an example operating environment in accordance with implementations of the present disclosure.

FIG. 1A depicts an example system 100 that can execute implementations of the present disclosure. A multi-unit building 102 includes multiple rooms 104a, 104b, 104c, each room including vents for air inlet 106 and air return 108 for a HVAC system 110. HVAC system 110 can be, for example, a forced or mechanical system including an air handler to control humidity, odors, and contaminants. A room 104a can include an alternative exhaust vent 112, where air from within room 104a can be exhausted outside or through chemical scrubbers rather than returned via a return duct 114 within the HVAC system 110. Exhaust vent 112 can be accessed via a valve 116, e.g., a baffle, such that the return duct 114 is blocked off and air can only exhaust via the exhaust vent 112.

As depicted in FIG. 1A, the multiple rooms 104a, 104b, and 104c share a same HVAC system 110, where air from a particular room 104a can recirculate, via the HVAC system 110, to a different room 104b,c. Air can additionally be shared between rooms 104a, 104b, 104c via building passageways, e.g., hallways, doors between rooms, etc.

As depicted in FIG. 1A, air return 108 includes a smart filter apparatus 118. Though described with reference to FIG. 1A as located within or at an entry point to an air return 108 of an HVAC system, smart filter apparatus 118 may be located at any point of an HVAC system (e.g., air supply), as a component of a free-standing air filtration system (e.g., a portable air purifier), or the like.

Smart filter apparatus 118 includes a frame 120, e.g., a mesh or grate-style frame, and one or more sensors 122 supported by/affixed to the frame 120. Sensors 122 can be in data communication with a control unit 124 which may also be supported by/affixed to the frame 120. Sensor 122 is a device that is sensitized to detect a particular physical property. In the embodiment described with reference to FIGS. 1 and 2, the sensors 122 are sensitized to detect pathogens 123, e.g., a COVID-19 virus, however, it can be understood that the sensors 122 described can be sensitized to detect other contaminants and/or analytes of interest, e.g., toxic gases, mold/spores, other coronaviruses or other viruses, etc.

In some implementations, as depicted in FIG. 1A, smart filter apparatus 118 can include multiple sensors 122 where each sensor of the multiple sensors can be sensitized to a same or different pathogen 123. For example, each sensor of the multiple sensors 122 can be sensitized to a different virus than each other sensor, e.g., sensitized to different strains of the influenza virus, sensitized to different strains of coronavirus, etc. In another example, each sensor of the multiple sensors 122 can be sensitized to a same virus, e.g., sensitized to the virus that causes COVID-19.

Though the smart filter apparatus 118 is depicted in FIG. 1A as including five sensors 122 distributed on the frame 120, more or fewer sensors (e.g., a higher density of sensors) can be included in the smart filter apparatus 118 such that a probability of detecting a pathogen that is present in air flow through the smart filter apparatus 118 is at least a threshold probability (e.g., >95% detection for air flow including a pathogen, >90% detection for air flow including a pathogen, etc.)

In some implementations, smart filter apparatus 118 can include multiple sensors 122 where two or more sensors are sensitized to a same pathogen 123, and where the multiple sensors 122 include at least sensors that are sensitized to two or more different pathogens. For example, the smart filter apparatus 118 can include two or more sensors sensitized to a strain of the influenza virus and two or more sensors sensitized to a strain of the coronavirus.

In some implementations, sensors 122 can be in data communication with the control unit 124 and/or another data processing apparatus or server (e.g., a cloud-based server) via a network connection, e.g., a wireless or wired connection 126. Sensor 122 can provide detection signals to the control unit 124 and/or data processing apparatus or server, where the control unit 124, data processing apparatus, or server can generate a response to the detection signal.

Figure 1B:
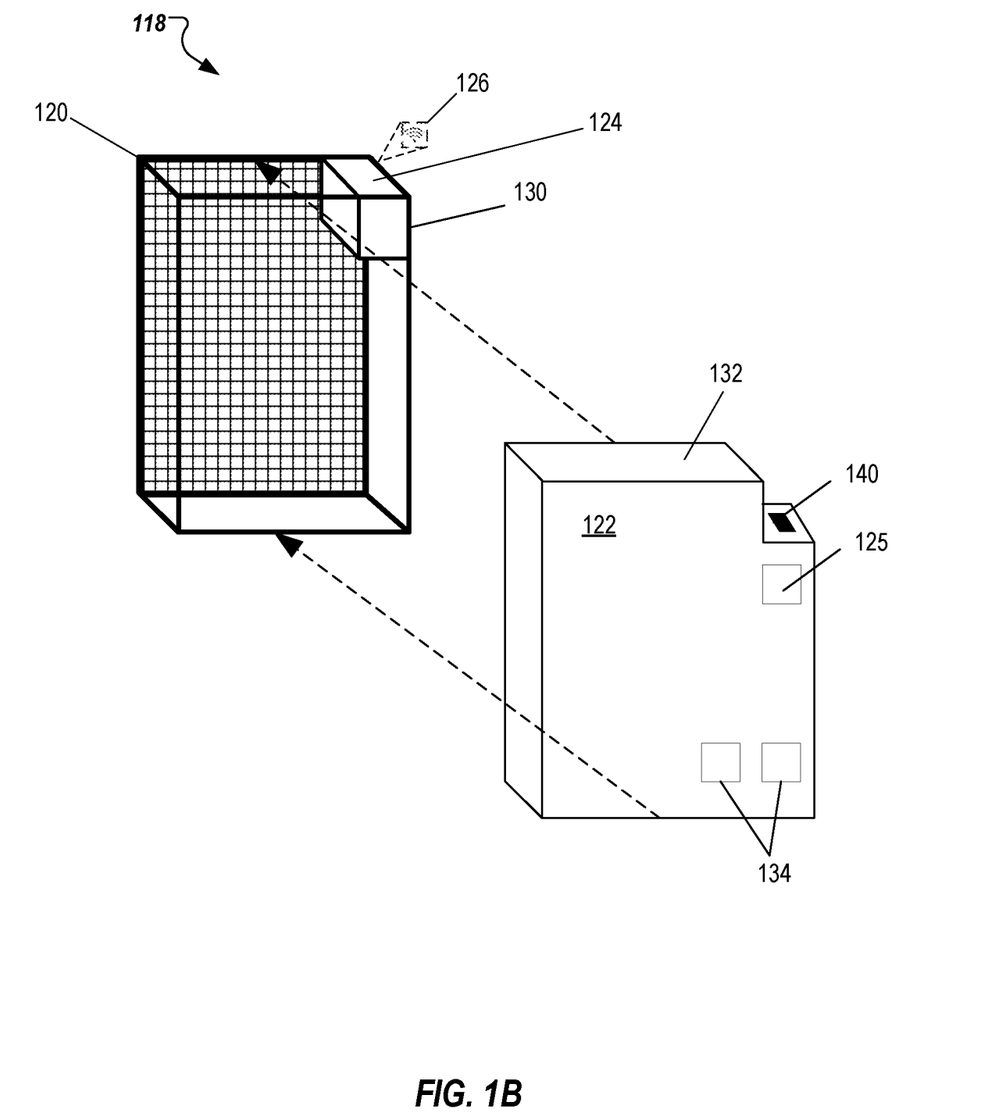
FIG. 1B depicts an example smart filter apparatus in accordance with implementations of the present disclosure.
Figure 1C:
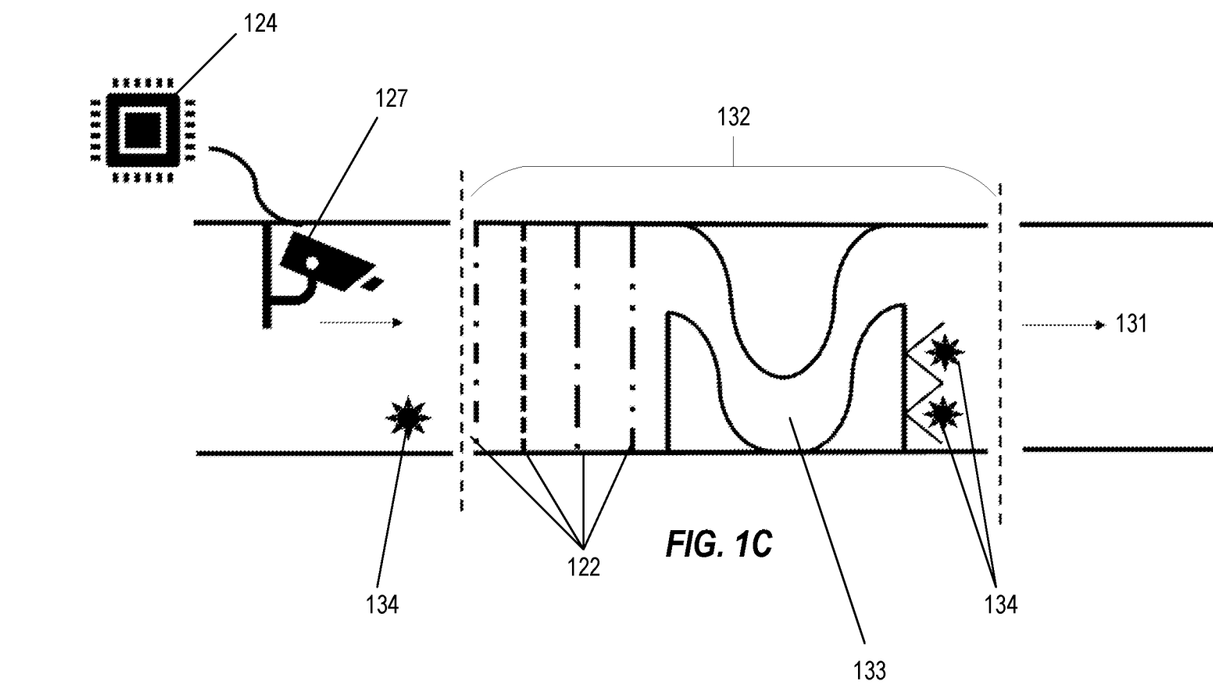
FIGS. 1C and 1D depict another example smart filter apparatus in accordance with implementations of the present disclosure.
Figure 1D:
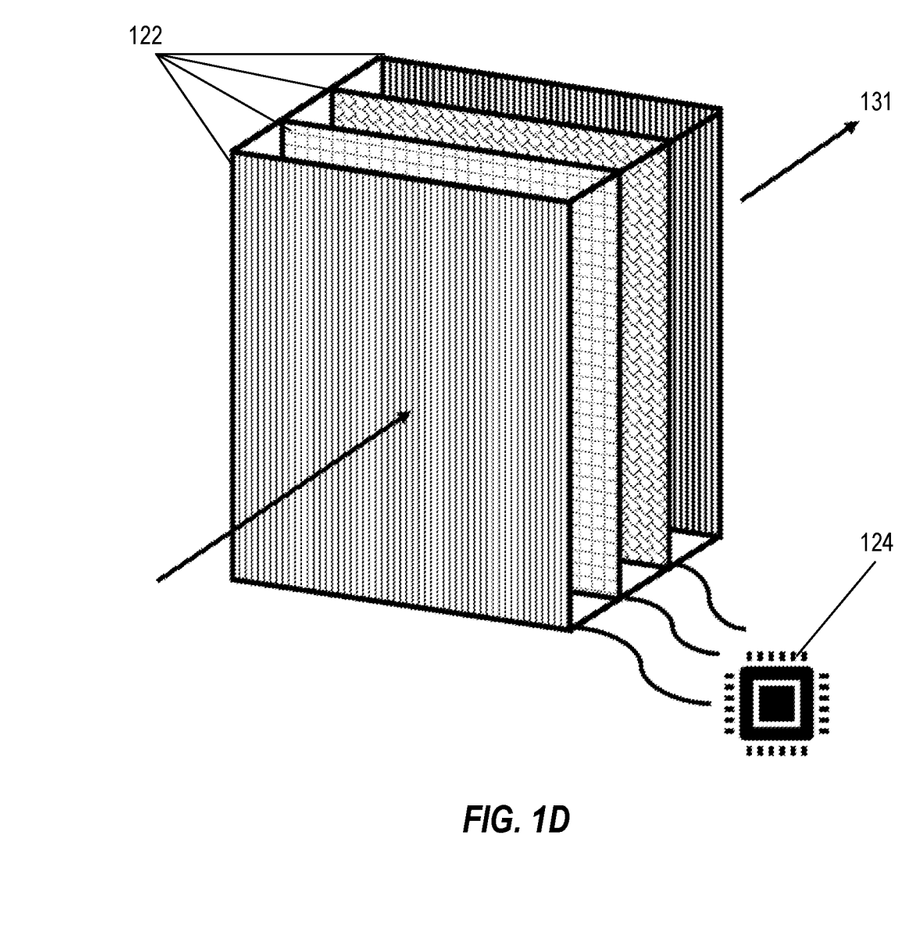

In some implementations, as depicted in FIGS. 1B-1D, a sensor 122 can include a biological sensor, e.g., a biosensor, that can include functionalized deoxyribonucleic acid (DNA) and/or ribonucleic acid (RNA) to bind to a particular pathogen 123 of interest in order to detect a genetic sequence for the pathogen 123. In one example, the sensor includes DNA and RNA material that binds to a COVID-19 virus, and produces a fluorescent signal when it comes in contact with the pathogen 123 of interest. Sensor 122 can include a coating applied to a filter in which the coating is functionalized to bind to a particular pathogen 123 of interest in order to detect a genetic sequence for the pathogen 123. Further details of filters 132 including biological sensors 122 are discussed below with reference to FIGS. 1C-1D.

A second, optical sensor 127, e.g., a fluorimeter, can be used to detect the fluorescent signal and provide a detection alert to the control unit 124. The sensor can additionally or alternatively generate an electrical signal in response to detection of the pathogen 123 of interest, where the electrical signal can be received by control unit 124. The electrical signal can indicate the detection of the pathogen 123 of interest, e.g., by carrying data indicating the detection or having a voltage/current level indicative of the detection.

In one example, isothermal RNA amplification can be linked to toehold switch RNA sensors, to detect relevant concentrations of pathogens of interest. A CRISPR/Cas9-based module can be utilized such that sensor 122 can discriminate between viral strains with single-base resolution. Some example techniques for using RNA sensors to detect strains of viruses are described in Pardee, Keith et al. (2016) "Rapid, Low-Cost Detection of Zika Virus Using Programmable Biomolecular Components," *Cell*, 165(5), 1255-1266, (https://doi.org/10.1016/j.cell.2016.04.059), which is incorporated herein by reference.

In some implementations, sensor 122 can include electrochemical biosensors, optical biosensors, electronic biosensors, piezoelectric biosensors, gravimetric biosensors, pyroelectric biosensors, a biosensor metal-oxide-semiconductor field-effect transistor (BioFET), or another similar sensor device that can be used to detect a pathogen 123 of interest.

Referring back to FIG. 1A, sensors 122 can be in data communication with control unit 124 via a wired and/or wireless connection 126. For example, sensors 122 can be in data communication 128 with control unit 124 via a wireless network, e.g., Bluetooth, Wi-Fi, Zigbee, local area network (LAN), wide area network (WAN), or the like. Control unit 124 can be, for example, a microcontroller and/or system on a chip.

In some implementations, control unit 124 can receive sensor data from sensors 122 on multiple smart filter apparatuses 118, e.g., located in multiple different rooms 104a, 104b, 104c and/or in multiple different air returns 108 for the different rooms 104a, 104b, 104c. For example, a central control unit 124 can receive response data from multiple smart filter apparatuses 118 over a network and coordinate a response based on the response data. In another example, control unit 124 can be a part of a HVAC system or climate control system for a building 102. Control unit 124 can be configured to provide and receive data via the network to multiple user devices, the HVAC system 110, and/or other facility systems, e.g., alarm system, lighting system, etc.

In some implementations, smart filter apparatus 118 can include a power source 130 to provide operational power to the sensors 122 and, optionally, the control unit 124. Power source 130 can be, for example, a battery source to provide power to the smart filter apparatus 118 for at least a threshold period of time. In some implementations, power source 130 can provide power to the components of the smart filter apparatus 118 for an amount of time corresponding to a lifetime of a filter. For example, a battery can be configured/selected to have a charge expected to last at least the useful or rated life of the filter. In a particular example, if the filter is rated for three months, e.g., recommended to be replaced every three months, a battery that is sized/rated to provide sufficient current to the smart filter apparatus 118 for three months can be used. Smart filter apparatus 118 can optionally receive power from the building 102, e.g., by connecting to 110 volt or 220 volt power source in the building in order to receive 12 volts (e.g., using a 12 volt power supply) for operating the components of the smart filter apparatus 118.

In some implementations, smart filter apparatus 118 includes a filter 132. A filter 132 can include, for example, a multi-layer filter material for standard commercial or residential HVAC systems. In another example, a filter 132 can be a high efficiency particulate air (HEPA) filter. Filter 132 may be a disposable item, e.g., replaceable periodically, or may be a reusable item, e.g., a cleanable/renewable filter, that may have an extended lifetime.

Frame 120 can be attached to filter 132 using attachment points, for example, using snaps, tabs, screws, latches adhesive, or other similar methods/mechanisms. Frame 120 can include one or more adjustable components to adjust one or more dimensions of the frame 120 to fit onto a given filter 132. In one example, a width and height of the frame 120 can have adjustable lengths such that frame 120 has a same outer perimeter as an outer perimeter of filter 132, e.g., as depicted in FIG. 1A.

In some implementations, filter 132 can be fabricated as a part of frame 120. In such an example, a lifetime of the frame 120 including sensors 122 may be limited to the lifetime of the filter 132. The smart filter apparatus 118 can be a temporary, replacement component in an HVAC system 110, where the smart filter apparatus 118 is replaced periodically, e.g., every 3 months.

In some implementations, frame 120 can be affixed to an existing filter 132 or other support within a ducting system that is part of air return 108. Frame 120 can be temporarily attached to an existing filter 132 or duct system and can be removed and reattached when filter 132 is replaced. In some implementations, an array of sensors 122 can be located within a duct of the air return 108 portion of the HVAC system 110, e.g., attached to a wall of a duct, suspended within a duct, or the like. Sensors 122 can be affixed within the HVAC system 110, frame 120, or filter 132, such that the sensors are in a fluidic path of return airflow from the air return 108.

In some implementations, smart filter apparatus 118 includes one or more ultraviolet (UV) light sources, e.g., UV light emitting diodes (LEDs). Each UV light source can emit UV-C light, e.g., far UV-C light at 222 nm light, that can inactivate or kill airborne pathogens passing through the filter 132. The light from the UV light sources can be shielded such that light exposure is constrained to expose only the smart filter apparatus 118 and/or the environment immediately surrounding the smart filter apparatus 118. For example, a spread of light emitted by the UV light sources can be limited to a particular area/directionality by use of optical components (e.g., lenses to concentrate and/or direct emitted light) or physical shielding. Shielding (e.g, using optics to limit a spread of light and/or physical shields) can be utilized to shield UV-C light from being incident on the filter 132 of the smart filter apparatus 118, e.g., to protect a biological coating on the filter 132. Alternatively or additionally, UV light sources 134 can be utilized to purify or reset the sensors 122 of the smart filter apparatus after exposure to pathogens.

The UV light sources 134 can be disposed around a perimeter of the smart filter apparatus 118 and/or disposed in an array such that a volume of air passing through the smart filter apparatus 118 is exposed to sufficient far UVC light to inactive or kill the airborne pathogens. In other words, a number UV light sources can be selected based on a requirement to provide sufficient irradiation to a volume of air passing through the smart filter apparatus 118 to render airborne pathogens inactive or destroy them. By arranging the UV light sources 134 around the perimeter of the smart filter apparatus 118, the UV light sources 134 can be out of the path of airflow, thereby not resisting the flow of air through the duct.

In one example, an average irradiance for an in-duct system can be in the range of 1000 to 10,000 $\mu W/cm^2$, depending in part, for example, on average air velocity through the duct, volume of the duct, an area of an irradiance zone (e.g., where the UV light sources 134 are located), an output of the one or more UV light sources, and the like. Cost considerations, (e.g., a cost per watt), a location of the irradiance zone, (e.g., upstream or a downstream location within the duct system), can be utilized to select a number UV light sources installed with the system. Some example techniques for determining irradiance requirements for an in-duct system are described by Atci, Fatih et al., (2021) "Evaluation of in-duct UV-C lamp array on air disinfection: A numerical analysis," *Science and Technology for the Built Environment*, 27(1), 98-108, (https://doi.org/10.1080/23744731.2020.1776549), which is incorporated herein by reference.

As shown in FIGS. 1A-1C, a UV light source 134 is affixed to a frame 120, e.g., to a mesh component, such that air flow through the smart filter apparatus 118 will be exposed to UV light from the UV light sources 134. The UV light sources 134 can be positioned to expose air flow incident on the smart filter apparatus 118, e.g., prior to the air flow passing through the filter 132. Alternatively or additionally, UV light sources 134 can be positioned to expose air flow exiting the smart filter apparatus 118, e.g., after the air flow has passed through the filter 132, and/or UV light sources 134 can be positioned to expose pathogens within the filter 132 (e.g., pathogens that have been trapped by the filter).

In some implementations, as depicted in FIG. 1B, UV light sources 134 may be embedded within a filter 132, e.g., HEPA filter, such that air passing through the filter 132 is purified while it is within the filter 132.

FIG. 1B depicts an example smart filter apparatus 118 in accordance with implementations of the present disclosure. In some implementations, as depicted in FIG. 1B, filter 132 includes a sensor 122, e.g., as a coating or otherwise incorporated into filter 132. In one example, filter 132 includes a bio-sensitive coating, e.g., a DNA and RNA material that binds to a particular virus. The bio-sensitive coating can produce a fluorescent signal in response to coming in contact with the particular virus. A second, different sensor 125, e.g., an optical sensor, can be included with the smart filter apparatus to detect the fluorescent signal and provide a detection signal to the control unit 124.

In some implementations, the sensor 125 can detect a change in fluorescence generated by the sensor 122 when sensor 122 comes in contact with a pathogen 123. Sensor 125 can be in data communication with control unit 124 and/or another data processing apparatus (e.g., a cloud-based server) configured to receive the detection signal and generate a pathogen alert response.

As depicted in FIG. 1B, filter 132 including the sensor 122 includes a contact 140, where contact 140, e.g., electrodes, can connect the sensor 122 in electrical contact with the control unit 124. Contact 140 can be used to provide data communication between filter 132 and control unit 124 when the filter 132 is installed within frame 120. Additionally, contact 140 can be used to provide power from the power source 130 to sensor 122, optical sensor 125, control unit 124, and/or filter 132.

In some implementations, light sources 134, e.g., one or more UV-C light sources, can be utilized to kill or render inert pathogens on the surface to "reset" the smart filter system. Alternatively, individual mesh pathogen detecting layers can be manually swapped after a pathogen is detected, and/or the filter 132 of the smart filter system can be installed with a "cartridge" of multiple filters that automatically swap after a pathogen is detected. In one example, a cartridge including multiple filters can include a filter wheel to retain the multiple filters, where a new filter of the multiple filters can be rotated (or otherwise swapped) in for a filter that has been determined to be exposed to the pathogen or a threshold amount of the pathogen.

In some implementations, as depicted in FIGS. 1C-1D, a smart filter apparatus includes a filter 132 including multiple sensors 122 and UV light sources 134. Each sensor 122 can be a mesh layer coated with a biological coating that is sensitized to a particular virus, e.g., an influenza virus detection coating, a coronavirus detection coating, or the like. Coating a portion or all of a surface of a mesh filter to form a sensor can allow for greater likelihood of detection of a pathogen by increasing a surface area exposed to the air flow 131 including the pathogen.

Filter 132 can additionally include a carbon filter, a HEPA or MERV filter, or the like, to perform filtration of particulates from the air flowing through the filter 132.

In some implementations, as depicted in FIG. 1C, filter 132 can include a curve 133 or wall portion located after the sensors 122 in the direction of air flow. The curve or wall can be utilized to shield UV light sources 134 that are located at an exit point of the smart filter apparatus 118, e.g., after the air has passed through the sensors 122. The UV light sources 134 can additionally or alternatively be located at an entry point of the smart filter apparatus, where the UV light sources 134 can be selectively activated (e.g., normally off) to disinfect air flow after a detection/reporting of a pathogen present in an air flow.

In some implementations, an optical sensor (e.g., a fluorimeter) can be utilized to detect a fluorescent reaction caused by an interaction of a pathogen with a sensor 122 that is sensitized to detect the pathogen. In one example, as depicted in FIGS. 1C-1D, a filter can include multiple sensors each sensitized to a different pathogen and configured to fluoresce a different wavelength in response to a detection of a respective pathogen. The optical sensor configured to detect a range of wavelengths including the multiple different wavelengths fluoresced by each of the different sensors can be utilized to detect the multiple different pathogens. Alternatively, multiple optical sensors, e.g., each configured to detect a particular range of wavelengths or a particular wavelength corresponding to a fluorescence of one or more sensors 122 can be utilized.

Figure 2:
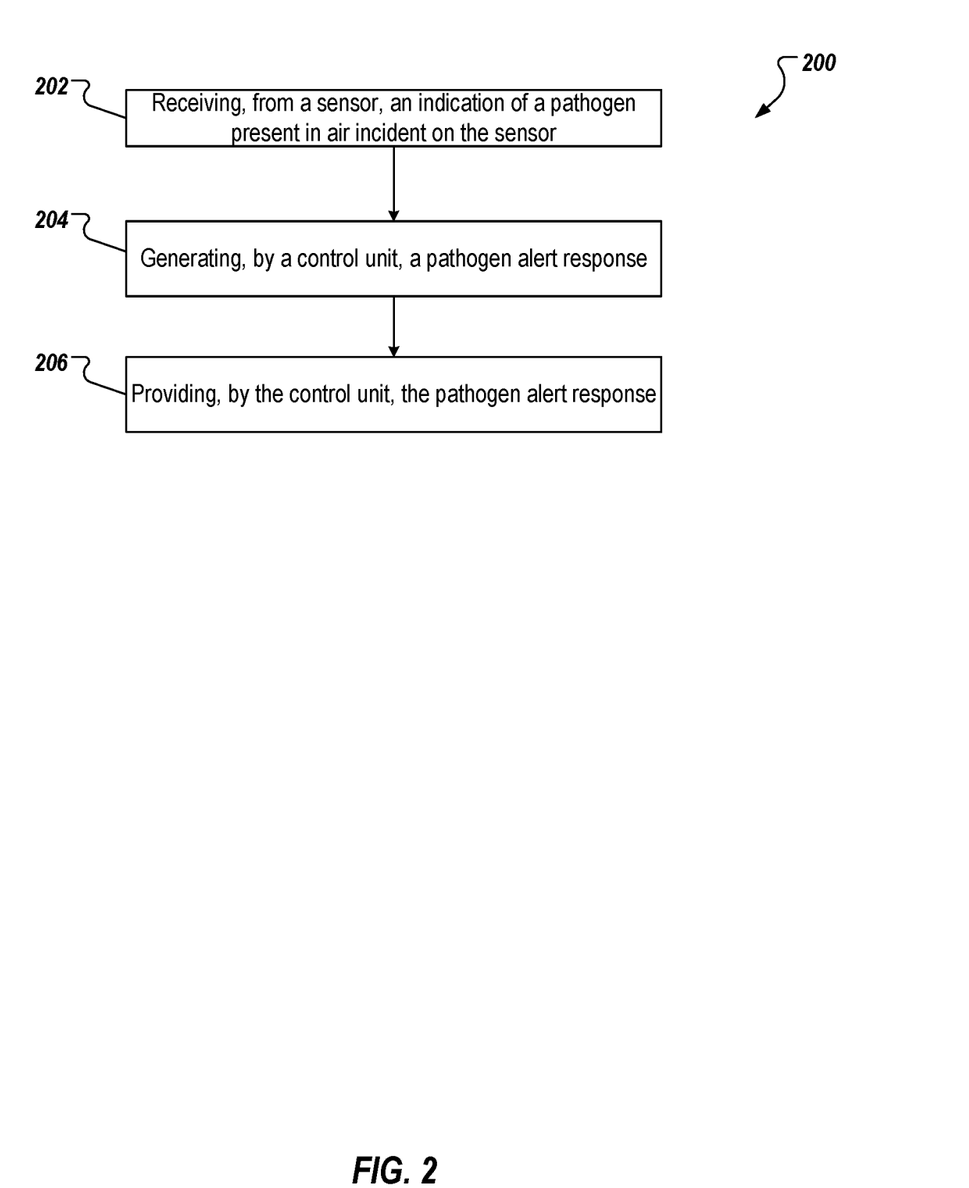
FIG. 2 is a flow diagram of an example process in accordance with implementations of the present disclosure.

FIG. 2 is a flow diagram of an example process 200 in accordance with implementations of the present disclosure. An indication of a pathogen present in air incident on a sensor is received (202). Referring now to FIG. 1, a sensor 122 is located at the air return 108 of an HVAC system 110, e.g., a sensor 122 that is supported by/affixed to a frame 120 which is attached to filter 132. Air from room 104a including pathogen 123 is returned through air return 108, e.g., using air circulation/movement from air inlet 106. Sensor 122, e.g., a biosensor, is located in the path of the air flow in air return 108 and detects pathogen 123. In response to a detection of the pathogen 123, sensor 122 generates a sensor response, e.g., an electrical signal, optical signal, or the like, that is indicative of a positive detection of the pathogen 123. In one example, the sensor response includes a bioluminescent response.

Returning to FIG. 2, in response to the indication of a pathogen present, a control unit generates a pathogen alert response (204). Referring back to FIG. 1, the control unit 124 can receive a sensor response from sensor 122, e.g., an electrical signal, that is indicative of the sensor 122 detecting the presence of the pathogen 123. The control unit 124 can then generate a pathogen alert response, based on, for example, a location of the sensor(s) 122 that have detected the pathogen 123, a number of other rooms 104 in fluidic contact with the room 104a including the sensor 122, people present within the room 104a including the detected pathogen 123, etc. For example, the control unit 124 can receive an indication of an occupancy (e.g., number of people present within the room 104a) using one or more occupancy sensors located within the room (e.g., cameras including facial/object recognition software, skeleton tracking, optical flow, or the like).

In some implementations, the control unit 124 can determine the number of rooms 104 in fluidic contact with the room 104a by accessing data specifying a layout of the building including the rooms, e.g., a blueprint or building schematic, and/or a map layout of the HVAC ducting system.

In some implementations, generating a pathogen alert response can include a set of rules dictating response narratives for the control unit in response to different detection scenarios. For example, the control unit may generate a first type of response if a detection occurs outside of business hours at a commercial facility and a second type of response if a detection occurs during business hours. The control unit 124 can maintain schedule data indicating business hours and access the schedule data when determining the type of response.

In some implementations, control unit 124 can determine one or more pathogen alert responses. Multiple pathogen alert responses can be set, e.g., by a facilities manager, depending on a level of contamination in the building 102. For example, a first response can be generated by the control unit 124 in response to a detection of pathogen 123 by one smart filter apparatus 118 in/for one room 104a. A second response can be generated by the control unit 124 in response to a detection of the pathogen 123 by multiple smart filter apparatuses 118 in/for multiple rooms 104a, 104b, 104c. For example, for a single contaminated room, a response can include isolating air flow from the room. In another example, for multiple contaminated rooms, a response can include evacuation of the entire building, e.g., by the control unit 124 activating an evacuation alarm in the building. Optionally, in both examples, the response can additionally include quarantine/testing protocol instructions to potentially exposed individuals.

Determining the pathogen alert response can include determining, by the control unit 124, one or more rooms 104a, 104b, and 104c where the pathogen 123 has been detected, and generating instructions for the HVAC system 110 to reroute air flow from the room(s) to an external exhaust 112, thereby isolating air flow from the room. For example, a sensor 122 located on a smart filter apparatus 118 in room 104a can detect the presence of the pathogen 123 and, in response, the control unit 124 can generate instructions to provide to the HVAC 110, e.g., via a network, that reroutes air flow from room 104a to exhausts 112, e.g., by switching a position of valve 116. In this way, the contaminated air is not routed to other rooms that may not be contaminated. In some implementations, the control unit 124 can send instruction directly to the valve 116, e.g., via a wired or wireless connection. In such an example, the valve 116 can be part of the smart filter apparatus 118.

In some implementations, the pathogen alert response can be to reroute air from each room for which the room's sensor 122 has detected the pathogen to the exhausts 112, e.g., using the valve 116 or a separate valve for the room if the HVAC system 110 has separate valves for different rooms. If a pathogen is detected for multiple rooms, e.g., in a threshold number or percentage of the rooms of the building, the pathogen alert response can be to reroute the air from all rooms in a building to the exhausts 112. For example, this can be considered a widespread contamination that requires rerouting the air from all rooms. In another example, the pathogen alert response can be to reroute air from a room in which a pathogen is detected and each adjacent room, but not necessarily all rooms.

In some implementations, a pathogen alert response can include generating an alert to send to one or more users, e.g., facilities manager, residents of the building, emergency response team, etc. A generated alert can be in the form of an audio/visual response, e.g., flashing lights, siren or recorded instructions. The generated alert can be in the form of a SMS/text, phone recording, email, pop-up alert, etc., to a user device. For example, the generated alert can be a text message to all devices associated with the building 102 informing the users of the incident.

In some implementations, a pathogen alert response can be an adjustment to operations of the HVAC system 110, e.g., re-routing air flow, increasing air flow to affected areas, closing off air return from affected areas, etc. In one example, air flow to the affected room 104a can be increased to diffuse the concentration of the virus in the room 104a.

Returning to FIG. 2, the control unit provides the pathogen alert response (206). Providing the pathogen alert response can include providing, by the control unit 124 to an HVAC system 110 over a network, a set of instructions to re-direct a flow of air from the room. In response, a controller of the HVAC system 110 can operate valves, e.g., baffles, to redirect the flow of air in accordance with the instructions. For example, the instructions may be to reroute air flow from room 104a to exhausts 112. In response, the controller of the HVAC system 110 can switch the position of valve 116. In some implementations, providing a pathogen alert response can include providing by the control unit 124 and to the HVAC system 110, instructions to increase air flow to the room via an air inlet of the HVAC system 110. In this example, the controller of the HVAC system 110 can activate a fan, increase the speed of the fan, or open a vent to allow more air flow into the room. When providing instructions to the HVAC system 110, the instructions can identify the room(s) to be controlled and the action for the room, e.g., exhaust the air or increase the flow of air to the room.

In some implementations, providing the pathogen alert response includes providing by the control unit 124 and to one or more users over the network, the alert comprising information about the presence of the pathogen in the air incident on the air filter. The alert can include instructions to evacuate, seek medical attention, take caution, or to provide other information. The alert can additionally include information regarding location and time of the detection.

Figure 3:
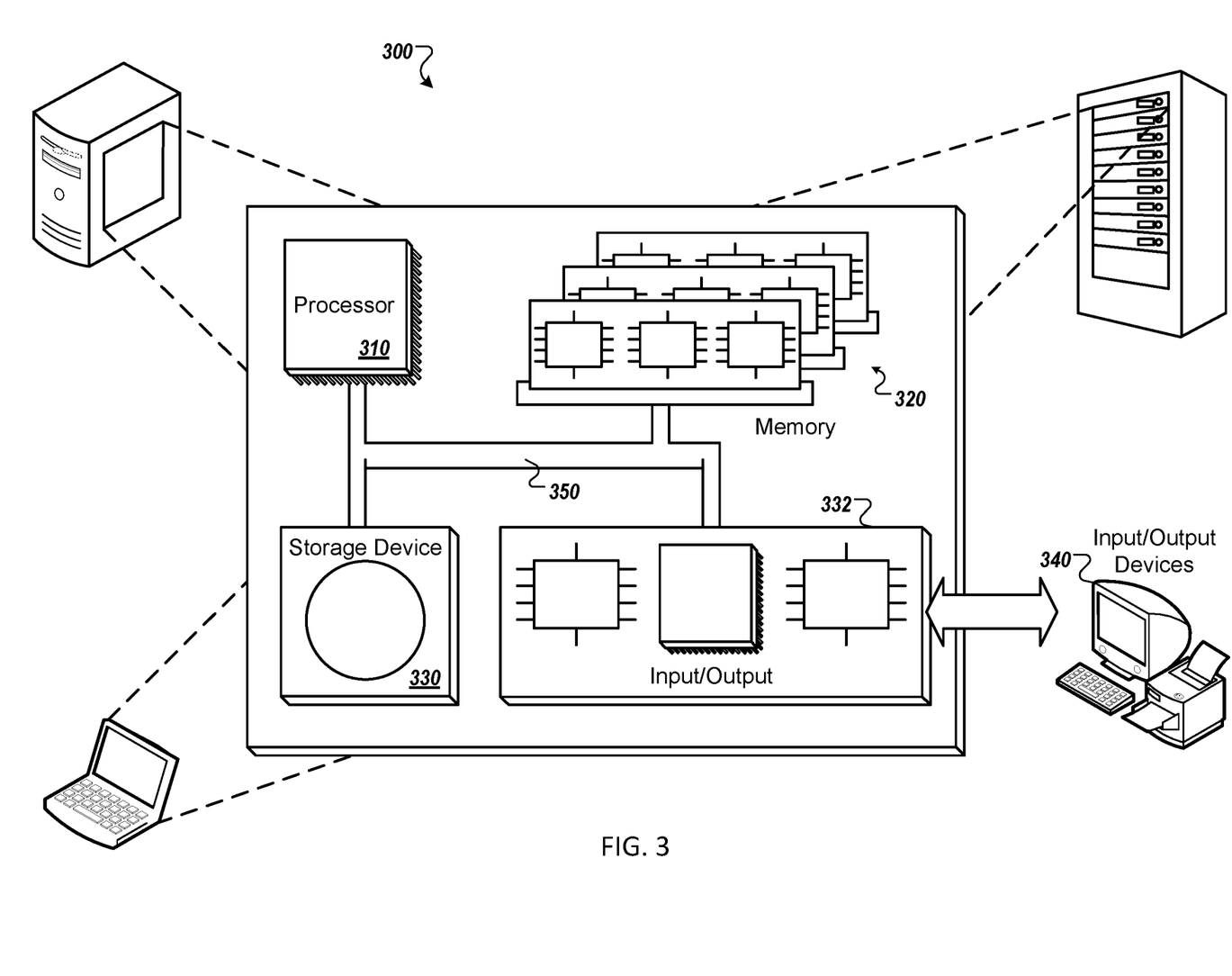
FIG. 3 is a block diagram of an example computer system.

FIG. 3 is a block diagram of an example computer system 300 that can be used to perform operations described above. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can include, for example, a hard disk device, an optical disk device, a storage device that is shared over a network by multiple computing devices (for example, a cloud storage device), or some other large capacity storage device.

The input/output device 340 provides input/output operations for the system 300. In one implementation, the input/output device 340 can include one or more network interface devices, for example, an Ethernet card, a serial communication device, for example, a RS-232 port, and/or a wireless interface device, for example, a 802.11 card. In another implementation, the input/output device can include driver devices configured to receive input data and send output data to other input/output devices, for example, keyboard, printer and display devices. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. An apparatus comprising:
    an air filter configured to filter particulates from air passing in a fluidic path through the filter;
    a detachable sensor frame including attachment points for removably mounting the sensor frame on the air filter, ahead in the fluidic path of the air filter:
    a sensor mesh that is supported by the detachable sensor frame and that includes multiple biological sensor elements that are (i) sensitized to fluoresce when in contact with a particular pathogen, and (ii) distributed across the detachable sensor frame to cover a face of the air filter that comes after the detachable sensor frame in the fluidic path;

an optical sensor that is affixed to the detachable sensor frame that is configured to detect, and to output a signal indicating, fluorescence from any of the biological sensor elements that are distributed on the detachable sensor frame; and a control unit that is affixed to the detachable sensor frame and that is in data communication with the optical sensor, the control unit being operable to perform operations comprising:

receiving, from the optical sensor, an indication that fluorescence was detected from one or more of the biological sensor elements that are distributed on the detachable sensor frame;

in response to receiving the indication, generating, by the control unit, a pathogen alert response; and providing, by the control unit, the pathogen alert response.

2. The apparatus of claim 1, comprising a power source that is affixed to the detachable sensor frame and that is operable to provide power to the optical sensor and the control unit, and that is sized based on an expected lifetime of the air filter.

3. The apparatus of claim 1, wherein providing the pathogen alert response comprises: providing, to a heating, ventilation, and air conditioning (HVAC) system, instructions to perform one or more of i) re-direct a flow of air from a room and increase air flow to the room via an air inlet of the HVAC system, and ii) isolate air circulation for the room including the air incident.

4. The apparatus of claim 3, wherein providing the pathogen alert response comprises, providing, to the HVAC system, instructions to redirect flow of air from the room comprising blocking the flow of air from a return duct of the HVAC system and exhausting the flow of air via an exhaust vent.

5. The apparatus of claim 1, wherein providing the pathogen alert response comprises: providing, to one or more users, an alert comprising information about a presence of the particular pathogen in the air incident on the air filter.

6. The apparatus of claim 1, wherein the particular pathogen is coronavirus, rhinovirus, or influenza.

7. The apparatus of claim 1, further comprising:
a valve operable to change a flow of air,
wherein providing the pathogen alert response comprises providing, to the valve and by the control unit, instructions to actuate the valve to change the flow of air.

8. The apparatus of claim 7, wherein the valve to control air flow is a baffle.

9. The apparatus of claim 1, wherein each biological sensor element is a bio-sensor coated in ribonucleic acid (RNA) or deoxyribonucleic acid (DNA).

10. The apparatus of claim 1, wherein the apparatus comprises one or more ultraviolet-C (UV-C) light sources supported by the air filter and configured to emit UV-C light away from the biological sensor elements.

11. The apparatus of claim 1, wherein providing the pathogen alert response comprises activating the one or more UV-C light sources on to the biological sensor elements.

12. The apparatus of claim 1, wherein providing the pathogen alert response comprises providing a notification to one or more users.

13. The apparatus of claim 1, comprising a second sensor mesh including multiple second biological sensor elements that are sensitized to fluoresce when in contact with a second, particular pathogen, and that are distributed across the detachable sensor frame to cover the face of the air filter that comes after the detachable sensor frame in the fluidic path, and that comes after the senor mesh in the fluidic path.

14. The apparatus of claim 1, comprising a baffle to prevent UV light that passes through the air filter from illuminating the sensor mesh.

15. The apparatus of claim 1, wherein the baffle comprises a curved portion that prevent UV light that passes through the air filter from directly illuminating the sensor mesh.

16. A computer-implemented method comprising:
receiving, by a control unit and from an optical sensor, an indication that fluorescence was detected from one or more of the biological sensor elements that included on a sensor mesh that is supported by a detachable sensor frame, and that are (i) sensitized to fluoresce when in contact with a particular pathogen, and (ii) distributed across the detachable sensor frame to cover a face of an air filter that comes after the detachable sensor frame in a fluidic path;

in response to receiving the indication, generating, by the control unit, a pathogen alert response; and providing, by the control unit, the pathogen alert response.

17. A non-transitory computer-readable medium storing instructions that, when executed by one or more computers, cause the one or more computers to perform operations comprising:
receiving, by a control unit and from an optical sensor, an indication that fluorescence was detected from one or more of the biological sensor elements that included on a sensor mesh that is supported by a detachable sensor frame, and that are (i) sensitized to fluoresce when in contact with a particular pathogen, and (ii) distributed across the detachable sensor frame to cover a face of an air filter that comes after the detachable sensor frame in a fluidic path;

in response to receiving the indication, generating, by the control unit, a pathogen alert response; and providing, by the control unit, the pathogen alert response.

* * * * *